US012234090B1

United States Patent
Boateng et al.

(10) Patent No.: US 12,234,090 B1
(45) Date of Patent: Feb. 25, 2025

(54) METAL DETECTOR FOR A RECEPTACLE

(71) Applicant: NonObvious LLC, Houston, TX (US)

(72) Inventors: Kelvin Yaw Agyapong Boateng, Houston, TX (US); Joseph Stephen Labdik, IV, Austin, TX (US)

(73) Assignee: NonObvious LLC, Houston, TX (US)

( * ) Notice: Subject to any disclaimer, the term of this patent is extended or adjusted under 35 U.S.C. 154(b) by 0 days.

(21) Appl. No.: 18/512,918

(22) Filed: Nov. 17, 2023

(51) Int. Cl.
*B65F 1/14* (2006.01)
*B65F 1/16* (2006.01)
*G01V 3/10* (2006.01)

(52) U.S. Cl.
CPC .......... *B65F 1/1484* (2013.01); *B65F 1/1607* (2013.01); *G01V 3/10* (2013.01); *B65F 2210/128* (2013.01); *B65F 2210/1525* (2013.01); *B65F 2210/168* (2013.01)

(58) Field of Classification Search
CPC ............... B65F 1/1484; B65F 1/1607; B65F 2210/128; B65F 2210/1525; B65F 2210/168; G01V 3/10
See application file for complete search history.

(56) References Cited

U.S. PATENT DOCUMENTS

| | | | |
|---|---|---|---|
| 4,742,339 A | 5/1988 | Baziuk | |
| 5,576,621 A | 11/1996 | Clements | |
| 5,797,497 A | 8/1998 | Edwards | |
| 6,222,450 B1 * | 4/2001 | Clements | B65F 1/1473 340/568.1 |
| 6,833,789 B1 | 12/2004 | Carmen et al. | |
| 7,683,779 B1 | 3/2010 | Pacheco | |
| 9,089,318 B2 | 7/2015 | Henniges et al. | |
| 2004/0000904 A1 | 1/2004 | Cotter | |
| 2014/0340099 A1 | 11/2014 | Butterworth et al. | |
| 2021/0130073 A1 * | 5/2021 | Hall | B65D 25/2867 |

* cited by examiner

*Primary Examiner* — Jacob S. Scott
*Assistant Examiner* — Miraj T. Patel
(74) *Attorney, Agent, or Firm* — Young Basile Hanlon & MacFarlane, P.C.

(57) ABSTRACT

A metal detector is used with a receptacle to receive refuse. The metal detector includes a body defining an opening, a controller, and a coil wound around the opening. The controller detects changes to a magnetic field generated by the coil when an object comprised of a metallic material that is located proximate the coil interacts with the magnetic field and induces a voltage within the coil. A capacitive sensor is mounted to the body and communicates with the controller. The controller is configured to detect the object located within the opening based on a proximity signal produced by the capacitive sensor when the object interacts with an electrical field of the capacitive sensor. When the controller determines that the object is comprised of a metallic material and disposed within the opening based on the induced voltage and the proximity signal, the metal detector correspondingly produces an alarm.

20 Claims, 13 Drawing Sheets

METAL DETECTOR FOR A RECEPTACLE

TECHNICAL FIELD

This disclosure relates generally to the field of metal detectors for use with a receptacle.

BACKGROUND

Receptacle systems may utilize a metal detector. The metal detector is used to inspect refuse (i.e., discarded material) that passes into the receptacle system for metallic objects. The metal detector alerts an operator to the presence of the metallic object. The operator may in turn choose to remove the metallic object from the refuse.

SUMMARY

One aspect of the disclosure is a metal detector for use with a receptacle to receive refuse. The metal detector includes a body defining an opening for receiving the refuse therethrough and a controller. The metal detector further includes a coil mounted to the body, wound around the opening, and in communication with the controller. The controller is configured to detect changes to a magnetic field generated by the coil when an object comprised of a metallic material that is located proximate the coil interacts with the magnetic field and induces a voltage within the coil. The metal detector further includes a capacitive sensor mounted to the body, facing into the opening, and in communication with the controller. The controller is further configured to detect the object located within the opening based on a proximity signal produced by the capacitive sensor when the object interacts with an electrical field of the capacitive sensor. When the controller determines that the object is comprised of a metallic material and disposed within the opening based on the induced voltage and the proximity signal, the metal detector correspondingly produces an alarm.

In some implementations of the metal detector, wherein the body comprises an external surface having a first portion that defines the opening and a second portion spaced from the first portion and facing away from the opening. The coil is mounted within the body between the first portion and the second portion.

In some implementations of the metal detector, the body comprises an internal surface defining a cavity that surrounds the opening. The coil is disposed along the internal surface adjacent the first portion of the external surface.

In some implementations of the metal detector, the body includes a top side and a bottom side, opposite the top side, with the opening extending through the body between the top side and the bottom side. The coil comprises a wire having a plurality of windings around the opening that extend between the top side and the bottom side.

In some implementations of the metal detector, the metal detector further comprises a shield disposed within the cavity between the coil and the second portion of the external surface and configured to reduce electromagnetic interference from outside of the opening of the body.

In some implementations of the metal detector, the shield surrounds the coil around the opening.

In some implementations of the metal detector, the shield extends substantially parallel to the coil.

In some implementations of the metal detector, the metal detector further comprises more than one of the capacitive sensor, with the capacitive sensors spaced around the body and each facing into the opening. The controller is configured to receive the proximity signals from the capacitive sensors and determine from the proximity signals that the object is disposed within the opening.

In some implementations of the metal detector, the body comprises rails arranged in a polygonal configuration about the opening. At least one of the capacitive sensors is disposed on each of the rails.

In some implementations of the metal detector, the body includes a top side and a bottom side, opposite the top side, with the opening extending through the body between the top side and the bottom side. The body defines a channel that extends in from the bottom side and is configured to receive a receptacle to which the metal detector is mounted.

In some implementations of the metal detector, the controller is configured to transmit pulses of a current to the coil to create the magnetic field that interacts with the object that is detected by the controller as the induced voltage.

In some implementations of the metal detector, the controller is configured to measure an integrated voltage of the coil over a period of time from the induced voltage and compare the integrated voltage to an average voltage to determine if the object is comprised of a metallic material.

In some implementations of the metal detector, the metal detector further comprises a speaker in communication with the controller. The alarm comprises an audible output produced by the speaker.

One aspect of the disclosure is a metal detector for use with a receptacle to receive refuse. The metal detector includes a body that includes a top side and a bottom side, opposite the top side, and defines an opening extending through the body between the top side and the bottom side and configured to receive the refuse therethrough. The metal detector further includes a controller and a coil mounted to the body, wound around the opening, and in communication with the controller. The controller is configured to detect changes to a magnetic field generated by the coil when an object comprised of a metallic material and located within the opening interacts with the magnetic field and induces a voltage within the coil. The metal detector further includes a door positioned adjacent the bottom side of the body and moveable between a closed position and an open position. The door in the closed position is configured to retain the refuse therein and the controller determines from the induced voltage that the refuse includes the object comprised of the metallic material. The door in the open position is configured to allow the refuse to move through the opening and into the receptacle after removal of the object from the refuse.

In some implementations of the metal detector, when the controller determines that the object is comprised of the metallic material and disposed within the opening based on the induced voltage, the metal detector correspondingly produces an alarm.

In some implementations of the metal detector, the metal detector further comprises a handle coupled to the door and configured to be actuated by an operator and correspondingly move the door between the closed position and the open position.

In some implementations of the metal detector, the door comprises a first section and a second section each pivotally coupled to the body. The first section and the second section extend toward one another in the closed position and are configured to pivot away from one another in the open position to allow the refuse to move through the opening.

In some implementations of the metal detector, the metal detector further comprises a capacitive sensor mounted to the body and facing into the opening. The controller is configured to detect the object located within the opening from a proximity signal produced by the capacitive sensor when the object interacts with the electrical field of the capacitive sensor. When the controller determines that the object is comprised of a metallic material and disposed within the opening based on the induced voltage and the proximity signal, the metal detector correspondingly produces an alarm.

In some implementations of the metal detector, the body includes a top side and a bottom side, opposite the top side, with the opening extending through the body between the top side and the bottom side. The body defines a channel that extends in from the bottom side and is configured to receive a receptacle to which the metal detector is mounted.

One aspect of the disclosure is a metal detector for use with a receptacle to receive refuse. The metal detector includes a body having a top side and a bottom side, opposite the top side. The body includes an external surface having a first portion and a second portion spaced from and facing away from the first portion, the first portion defining an opening extending through the body between the top side and the bottom side and configured to receive the refuse therethrough and an internal surface defining a cavity that surrounds the opening. The metal detector further comprises a controller and a coil mounted to the body within the cavity and disposed along the internal surface adjacent the first portion of the external surface. The coil comprises a wire having a plurality of windings around the opening that extend between the top side and the bottom side. The controller is in communication with the coil and the controller is configured to detect changes to a magnetic field generated by the coil when an object comprised of a metallic material and located within the opening interacts with the magnetic field and induces a voltage within the coil. The metal detector further comprises a shield disposed within the cavity between the coil and the second portion of the external surface, surrounding the coil around the opening, and configured to reduce electromagnetic interference from outside of the opening of the body. The body defines a channel that extends in from the bottom side and is configured to receive a receptacle to which the metal detector is mounted.

DETAILED DESCRIPTION

A metal detector can be used with a receptacle to receive refuse. The refuse may be anything that is thrown aside, discarded, exhausted its use, or is otherwise unwanted in the environment in which the refuse is located. In one example, the metal detector may be in an operating room of a hospital, where the refuse may include various items (such as linens, bandages, wrappings, sponges, etc.) that are collected as refuse for disposal, laundering, etc. This refuse may inadvertently include medical instruments (e.g., scalpels, clamps, cannulas, etc.) that are dispersed within the refuse. These medical instruments are typically expensive and are commonly comprised of metallic materials, which allows the instruments to be sanitized in an autoclave. As such, the hospital may prioritize preventing the medical instruments from being disposed of in the refuse. The use of the metal detector with the receptacle alerts an operator to potentially valuable medical instruments that are being discarded in the refuse.

Typical metal detectors include a coil wound around an opening. The metal detectors are configured to detect metallic materials that are disposed within refuse. However, the metal detectors may emit false alarms if metallic object passes near the metal detector, not just through the opening.

The metal detector described herein is configured to detect the presence of a metallic material within the refuse with reduced interference and false alarms from objects outside the opening of the metal detector. In one example, the metal detector includes a capacitive sensor that faces into the opening and detects the proximity of an object within the opening. The input from the capacitive sensor as well as the input from the coil allows a controller of the metal detector to determine if an object comprised of a metallic material is disposed within the opening. In another example, the metal detector includes a shield, with the coil disposed between the shield and the opening. The shield reduces electromagnetic interference from outside of the opening. In another example, the metal detector includes a door that selectively retains the refuse in the opening to determine if the refuse includes the object comprised of the metallic material.

FIGS. 1-4 are perspective, cross-sectional, top, and perspective view illustrations, respectively, of a metal detecting refuse container 100 that is configured to collect and retain refuse therein. As described above, the refuse may be anything that is thrown aside, discarded, exhausted its use, or is otherwise unwanted in the environment in which the refuse is located. As such, the refuse may include garbage, recyclable objects, soiled objects for laundering, etc.

Figure 1:
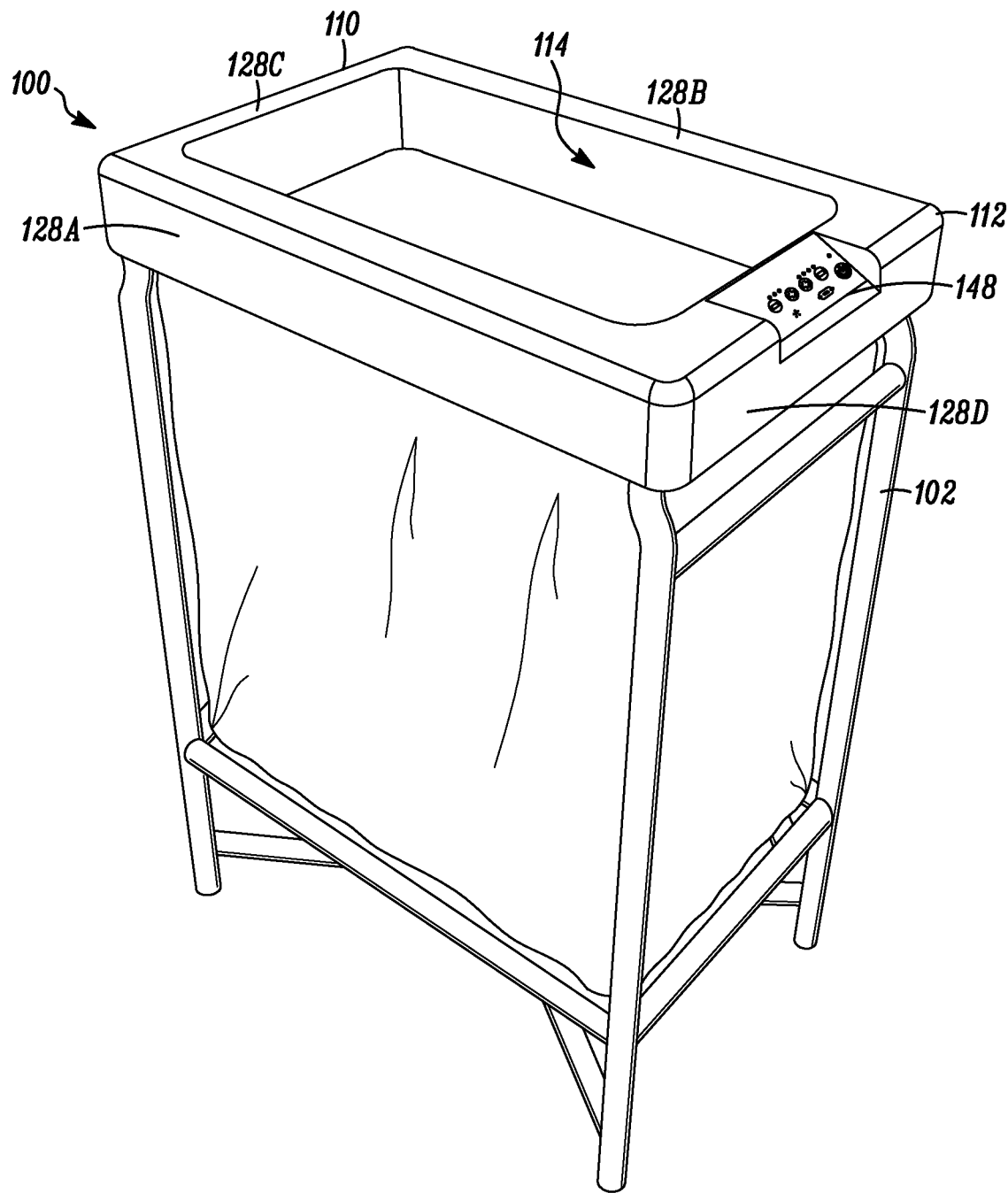
FIG. 1 is a perspective view illustration of an example implementation of a metal detecting refuse container having a metal detector and a receptacle.
Figure 2:
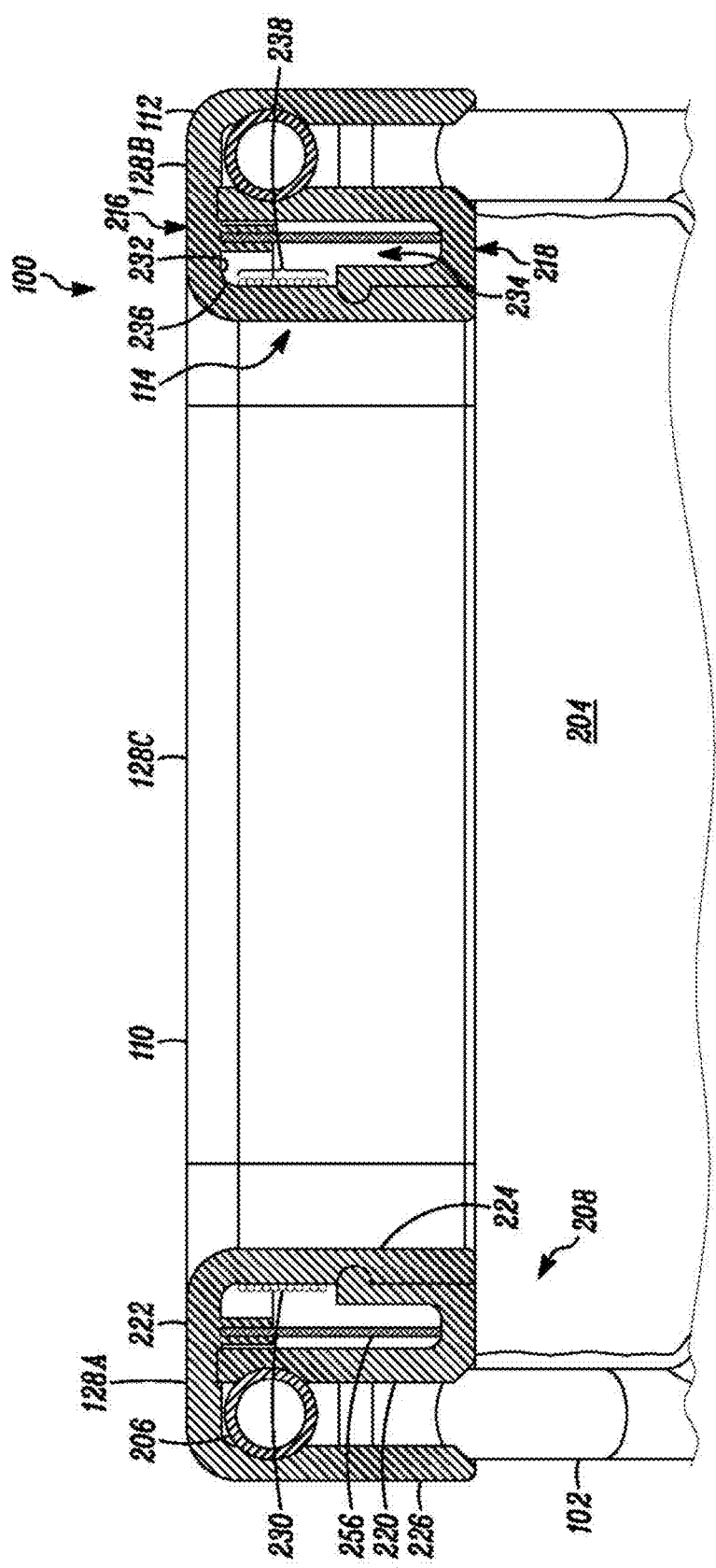
FIG. 2 is a cross-sectional view illustration of the metal detecting refuse container.

As shown in FIG. 1, the metal detecting refuse container 100 includes a receptacle 102 defining an interior 204 and having a perimeter surface 206 defining an aperture 208 that opens into the interior 204 (as shown in FIG. 2). More specifically, the perimeter surface 206 defines a top of the receptacle 102, with the aperture 208 opening downwardly into the interior 204 such that the refuse passes through the aperture 208 and is collected in the interior 204 of the receptacle 102. In one example, the receptacle 102 comprises a frame and a bag. The bag is mounted to and supported by the frame and defines the interior 204. In other examples, the receptacle 102 has a rigid construction and comprises a plurality of walls that define the interior 204. It is to be appreciated that the receptacle 102 may have any suitable configuration for collecting the refuse therein.

As shown in FIG. 1, the metal detecting refuse container 100 further includes a metal detector 110 for use with the receptacle 102 to receive the refuse. As will be better understood in the description below, the metal detector 110 is configured to detect the presence of an object, comprised of a metallic material, that is disposed within the refuse. The metal detector 110 in-turn alerts an operator of the presence of the object within the refuse. The operator may then inspect the refuse for the object and determine whether the object should continue to pass along into the receptacle 102 or be removed.

The metal detector 110 includes a body 112 defining an opening 114 for receiving the refuse therethrough. The metal detector 110 is mounted to the receptacle 102 and is positioned such that the opening 114 of the metal detector 110 is aligned with the aperture 208 of the receptacle 102. As such, the refuse passes through the opening 114 also passes through the aperture 208 into the interior 204 of the receptacle 102.

As shown in FIG. 2, the body 112 has a top side 216 and a bottom side 218, opposite the top side 216. The bottom side 218 faces toward the receptacle 102 while the top side 216 faces away from the receptacle 102. The body 112 may define a channel 220 that extends in from the bottom side 218 and is configured to receive a receptacle 102 to which the metal detector 110 is mounted. More specifically, the channel 220 of the body 112 is aligned with the perimeter surface 206 of the receptacle 102 such that the perimeter surface 206 is received within the channel 220. The body 112 and the receptacle 102 has interference fit within the channel 220 to retain the metal detector 110 to the receptacle 102. It is to be appreciated that any portion of the body 112 may be mounted to the receptacle 102 in any suitable manner, including mechanical fasteners, chemical bonding, welding, etc. Moreover, the body 112 may be integrally formed with receptacle 102 from a common material.

As shown in FIG. 2, the body 112 includes an external surface 222 having a first portion 224 and a second portion 226 spaced from and facing away from the first portion 224 (and the opening 114). The first portion 224 defines the opening 114 extending through the body 112 between the top side 216 and the bottom side 218 and is configured to receive refuse therethrough.

Figure 3:
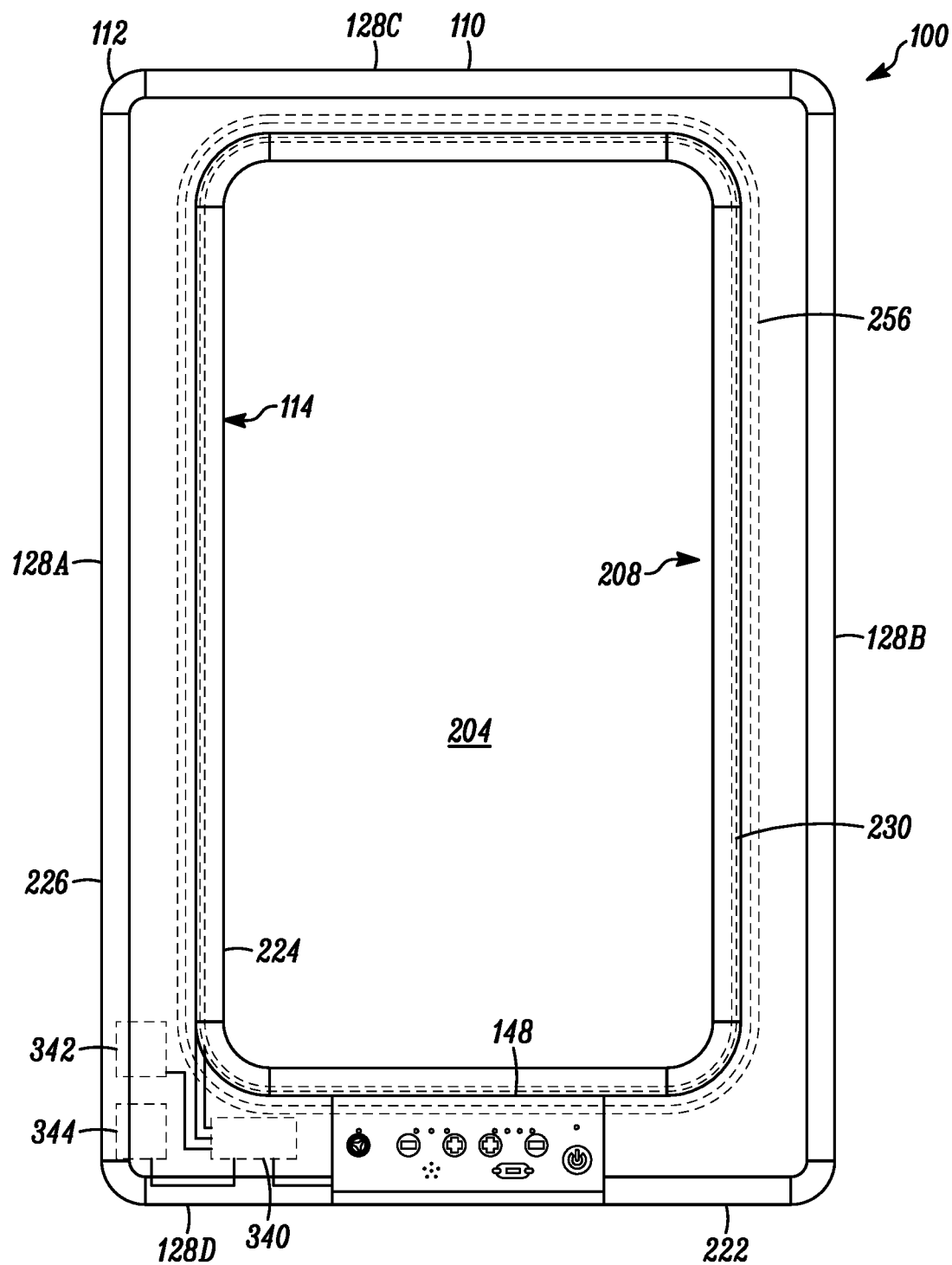
FIG. 3 is a top view illustration of the metal detector showing a coil and a shield.

In the example shown in FIGS. 1 and 3, the body 112 comprises rails 128A-D arranged in a polygonal configuration about the opening 114. The body 112 comprises four of the rails 128A-D positioned end-to-end in a rectangular configuration. However, any number of the rails may be utilized in any shape or configuration. Moreover, while the rails 128A-D shown in the Figures extend in a linear configuration, the rails 128A-D may include one or more curves such that the rails 128A-D have arcuate configurations. Moreover, each of the rails 128A-D may be comprised of both arcuate and linear sections. Furthermore, in other configurations a single rail may be utilized. For example, the rail may be curved into a ring configuration.

As shown in FIGS. 2 and 3, the metal detector 110 further comprises a coil 230 mounted to the body 112 and wound around the opening 114. The coil 230 is mounted within the body 112 between the first portion 224 and the second portion 226. More specifically, the body 112 further includes an internal surface 232 defining a cavity 234 that surrounds the opening 114. The coil 230 is mounted to the body 112 within the cavity 234 and is disposed along the internal surface 232 adjacent the first portion 224 of the external surface 222. However, the coil 230 may be positioned at any suitable within the body 112 or outside the body 112 (e.g., along the external surface 222. Furthermore, the coil 230 may be encapsulated within the body 112 (i.e., the body 112 comprised of a polymer may be overmolded onto the coil 230).

The coil 230 comprises a wire 236 having a plurality of windings 238 around the opening 114 that extend between the top side 216 and the bottom side 218. The wire 236 may be comprised of copper, aluminum, gold, or any other electrically conductive material. As will be better understood in the description below, the windings 238 of the coil 230 allow for the creation of a magnetic field when a current is transmitted through the coil 230, or the creation of a current within the coil 230 when introduced to a magnetic field.

As shown in FIG. 3, the metal detector 110 further comprises a controller 340. The controller 340 may comprise at least one processor and at least one non-transitory computer-readable medium. The at least one non-transitory computer-readable medium may include other data such as control logic, software applications, instructions, computer code, data, lookup tables, etc. A computer readable medium includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. The non-transitory computer readable medium 108 may include media where data can be permanently stored and media where data can be stored and later overwritten, such as a rewritable optical disc or an erasable memory device. Computer code includes any type of program code, including source code, object code, and executable code. The processor is configured to execute the code or instructions.

The metal detector 110 may further include a battery 342 electrically connected to the controller 340. The battery 342 is configured to hold an electric charge and discharge electricity to the controller 340 for powering the controller 340. The metal detector 110 may further include a power supply 344 electrically connected to the controller 340. The power supply 344 may be configured to be plugged into an outlet for receiving electricity. The power supply 344 may be configured to transmitting electricity as direct current (DC) and/or alternating current (AC) to the controller 340. As such, the power supply 344 may be configured to directly power the controller 340, rather than the controller 340 being powered by the battery 342. The power supply 344 may also be electrically connected to the battery 342 and configured to charge the battery 342. As such, the power supply 344 may provide the charge to the battery 342 that allows the battery 342 to power the controller 340 when the power supply 344 is disconnected from the outlet.

The coil 230 is in communication with the controller 340. More specifically, the wire 236 of the coil 230 terminates at a pair of terminals that are connected to the controller 340.

The controller 340 is configured to detect changes to a magnetic field generated by the coil when the object comprised of the metallic material and located proximate the coil 230 and within the opening 114 interacts with the magnetic field and produces an induced voltage within the coil 230. The metal detector 110 in-turn correspondingly produces an alarm.

Figure 4:
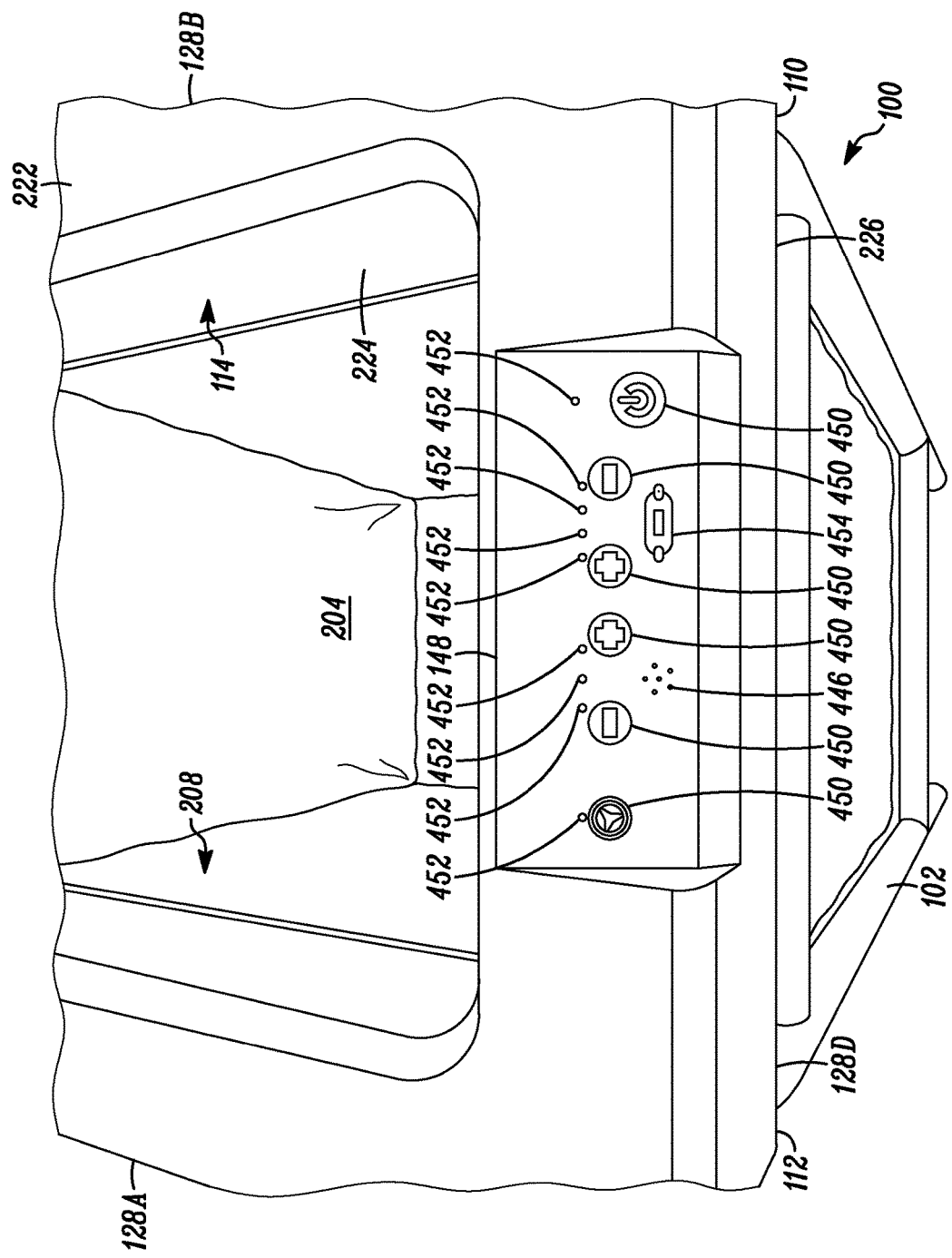
FIG. 4 is a perspective view illustration of the metal detector showing a panel.

The metal detector 110 further comprises a speaker 446 in communication with the controller 340. The alarm comprises an audible output produced by the speaker 446, as shown in FIG. 4. It is to be appreciated that the alarm may further comprise a visual output (such as light produced by a light emitting diode, a lightbulb, etc.), a haptic output (such as an electric actuator), etc.

The controller 340 is configured to transmit pulses of a current to the coil 230 to create the magnetic field that interacts with the object that is detected by the controller 340 as an induced voltage. More specifically, the pulses of the current within the coil 230 produces the magnetic field of the coil 230. If the object is comprised of a metallic material that is further comprised of a magnetically permeable material (such as iron), the magnetic field of the coil 230 induces eddy currents in the object, which in turn generate a magnetic field that interacts with the coil 230. When the current in the coil 230 shuts off between pulses, the magnetic field generated by the object induces a voltage within coil 230. If the object is comprised of a metallic material that is not further comprised of a magnetically permeable material, it interacts with the coil in the same way as stated above. In either example, the controller 340 is configured to measure an integrated voltage of the coil over time and compare the integrated voltage to an average voltage to determine if the object is comprised of a metallic material. The average voltage serves as a baseline and is measured when the metal detector 110 powers on. The average voltage may be recalculated over a time interval (e.g., every 60 seconds) to reduce noise introduced within the changing environment around the metal detector 110. For example, recalculating the average voltage may accommodate for noise that results from a metal component being moved into proximity of the metal detector 110 but outside the opening 114 (e.g., within the same room as the metal detector 110). As such, the controller 340 accounts for the metal component being moved into the range of sensitivity outside of the body 112 of the metal detector 110 and also for other sources of electromagnetic interference within the room.

As such, upon powering on the metal detector 110, the controller 340 determines the average voltage of the coil 230. The average voltage is recalculated over the desired time interval to adjust to changes in noise. The average voltage is stored in memory. The controller 340 continues to pulse the current to the coil 230. When the object comprised of the metallic material enters the opening 114, the magnetic field of the coil 230 induces eddy currents in the object, which in turn generate a magnetic field that interacts with the coil 230. When the current in the coil 230 shuts off between pulses, the magnetic field generated by the object induces a voltage within coil 230. The controller 340 measures the integrated voltage of the coil over time and compares the integrated voltage to the average voltage stored in memory. If the difference between the integrated voltage and the average voltage is greater in magnitude than a threshold value set when the system powers on, the controller 340 determines that the object comprised of a metallic material is disposed in the refuse.

The disposition of the coil 230 along the internal surface 232 adjacent of the first portion 224 of the external surface 222 places the coil 230 adjacent the opening 114, which maximize the sensitivity of the coil 230 within the opening 114 while minimizing sensitivity outside of the opening 114.

As shown in FIG. 1, the metal detector 110 may comprise a panel 148 disposed on the body 112 and accessible to the operator. The panel 148 is in electronic communication with the controller 340. As shown in FIG. 4, the panel 148 may comprise one or more input 450 (e.g., buttons, touchscreens, switches, etc.) that send signals to the controller 340 to adjust various functions, such as the volume of the alarm, muting and unmuting of the alarm, the sensitivity of the coil 230 to metal (i.e., signal to noise ratio set in multiples of the average noise from the average voltage), power on/off toggling, etc. The panel 148 may comprise one or more output 452 (e.g., lights, display screens, etc.) that display output information to the operator, such as the illumination of a light indicating the detection of metal, the illumination of a light indicating mute/unmute status, etc. The panel 148 may further include an interface 454 configured to allow electronic communication between the controller 340 and an external electronic device for data upgrades, firmware upgrades, etc. The interface 454 may be a USB port, Bluetooth® transmitter/receiver, Wi-Fi transmitter/receiver, etc.

As shown in FIGS. 2 and 3, the metal detector 110 further comprises a shield 256 disposed within the cavity 234 between the coil 230 and the second portion 226 of the external surface 222 and surrounding the coil 230 around the opening 114 and configured to reduce electromagnetic interference (i.e., from electromagnetic radiation such as radio waves, electromagnetic fields, electrostatic fields, etc.) from outside of the opening 114 of the body 112. More specifically, the shield 256 surrounds the coil 230 around the opening 114 to ensure that the coil 230 is detecting the presence of metallic materials when they are disposed within the opening 114. In the example shown in FIG. 2, the shield 256 extends substantially parallel to the coil 230. However, the shield 256 may be disposed in any suitable location and have any suitable configuration to reduce the electromagnetic interference. The shield 256 may comprise a layer of metal (e.g., copper, brass, nickel, silver, steel, tin, etc.). The shield 256 reflects and/or absorbs the electromagnetic radiation. As such, in the example shown in FIG. 2, the shield 256 reduces false alarms from the detection of the objects disposed outside of the opening 114 by limiting the region that coil 230 is susceptible to electromagnetic radiation to within the opening 114.

Figure 5:
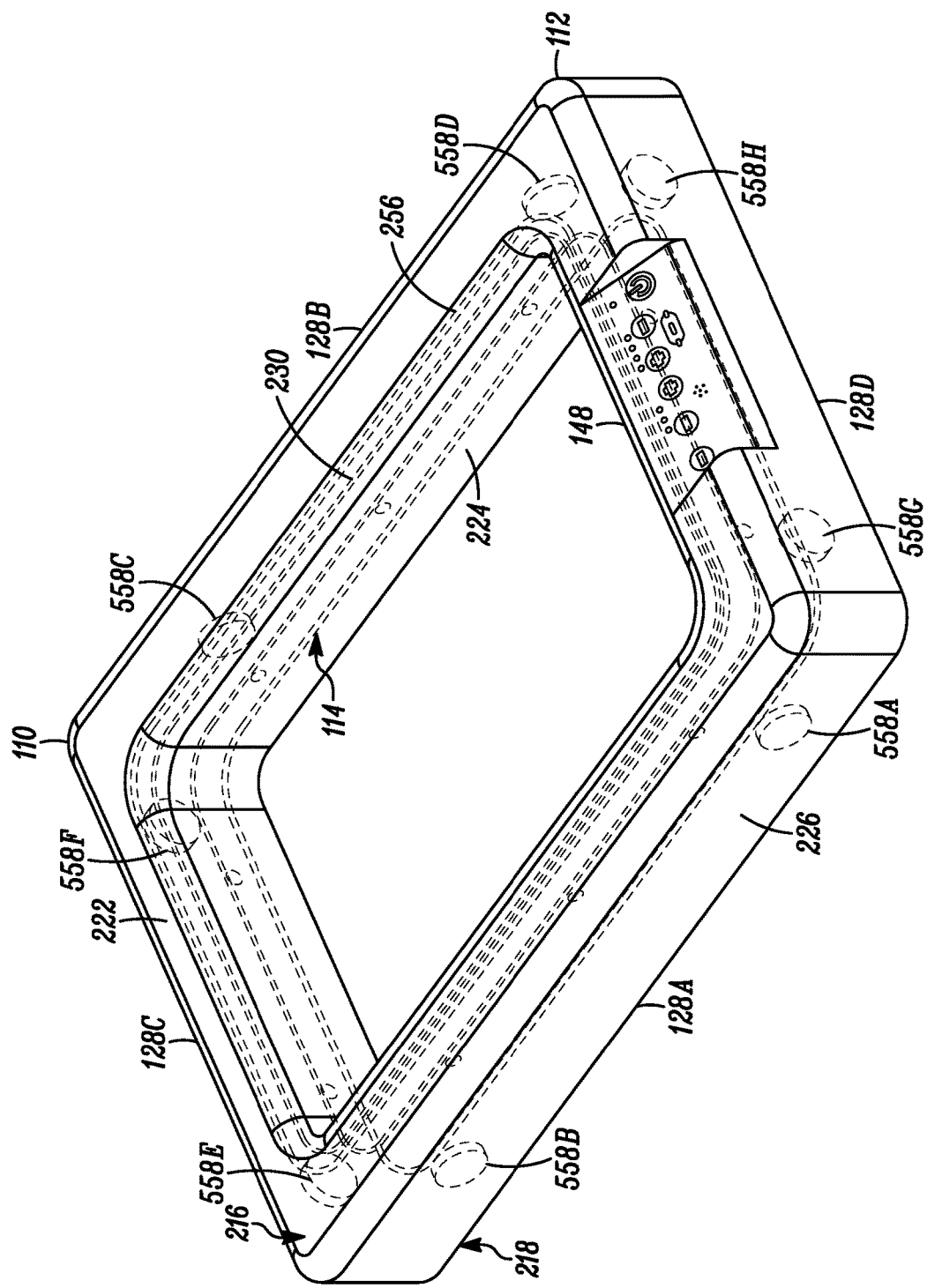
FIG. 5 is a perspective view illustration of an example implementation of the metal detector having a plurality of capacitive sensors.

FIG. 5 shows a perspective view illustration of an example implementation of the metal detector 110 further comprising a capacitive sensor 558A-H mounted to the body 112 and facing into the opening 114. The capacitive sensor A-H is in communication with the controller 340. The controller 340 is configured to detect the object located within the opening 114 from a proximity signal produced by the capacitive sensor 558A-H when the object interacts with an electrical field of the capacitive sensor 558A-H. More specifically, the capacitive sensor 558A-H emits the electrical field into the opening 114. If the object is conductive or has a dielectric constant that is different from the air surrounding the object in the electrical field, the sensor can measure the change to the capacitance of the system. Accordingly, the capacitive sensor 558A-H sends the proximity signal to the controller 340.

The controller 340 is in communication with both the coil 230 and the capacitive sensor 558A-H. When the controller 340 determines that the object is comprised of a metallic material and disposed within the opening 114 based on the induced voltage and the proximity signal, the metal detector 110 and correspondingly produces the alarm.

More specifically, the controller 340 monitors and compares the induced voltage from coil 230 and the proximity signal from the capacitive sensor 558A-H, with the controller 340 determining from the coil 230 if a metallic material is present and the controller 340 determining from the capacitive sensor 558A-H if an object is present in the opening 114. For example, if the induced voltage from the coil 230 indicates that metallic material is proximate the coil 230 and the proximity signal of the capacitive sensor 558A-H indicates that an object is disposed within the opening 114, the controller 340 may determine that the object comprised of the metallic material is disposed in the opening 114 and will initiate the alarm.

In another example, if the induced voltage from the coil 230 indicates that metallic material is proximate the coil 230 but the capacitive sensor 558A-H does not produce a proximity signal that indicates that an object is disposed within the opening 114, the controller 340 will determine that the object comprised of the metallic material is outside of the opening 114 and is not currently positioned to enter the receptacle 102. As such, the controller 340 will not initiate the alarm.

In another example, if the proximity signal of the capacitive sensor 558A-H indicates that an object is disposed within the opening 114 but an induced voltage is not produced within the coil 230, the controller 340 will determine that the object in the opening 114 is not comprised of the metallic material and will not initiate the alarm.

In the example shown in FIG. 5, the metal detector 110 further comprises more than one of the capacitive sensor 558A-H. The capacitive sensors 558A-H are spaced around the body 112 and each face into the opening 114. The controller 340 is configured to receive the proximity signals from the capacitive sensors 558A-H and determine from the proximity signals that the object is disposed within the opening 114. At least one of the capacitive sensors 558A-H is disposed on each of the rails 128A-D. In the example shown in FIG. 5, two of the capacitive sensors 558A-H are disposed on each of the four rails 128A-D, totaling eight of the capacitive sensors 558A-H. As described above, each of the capacitive sensors 558A-H face into the opening 114. Therefore, the transmission of opposing capacitive sensors 558A-H cross one another.

Figure 6A:
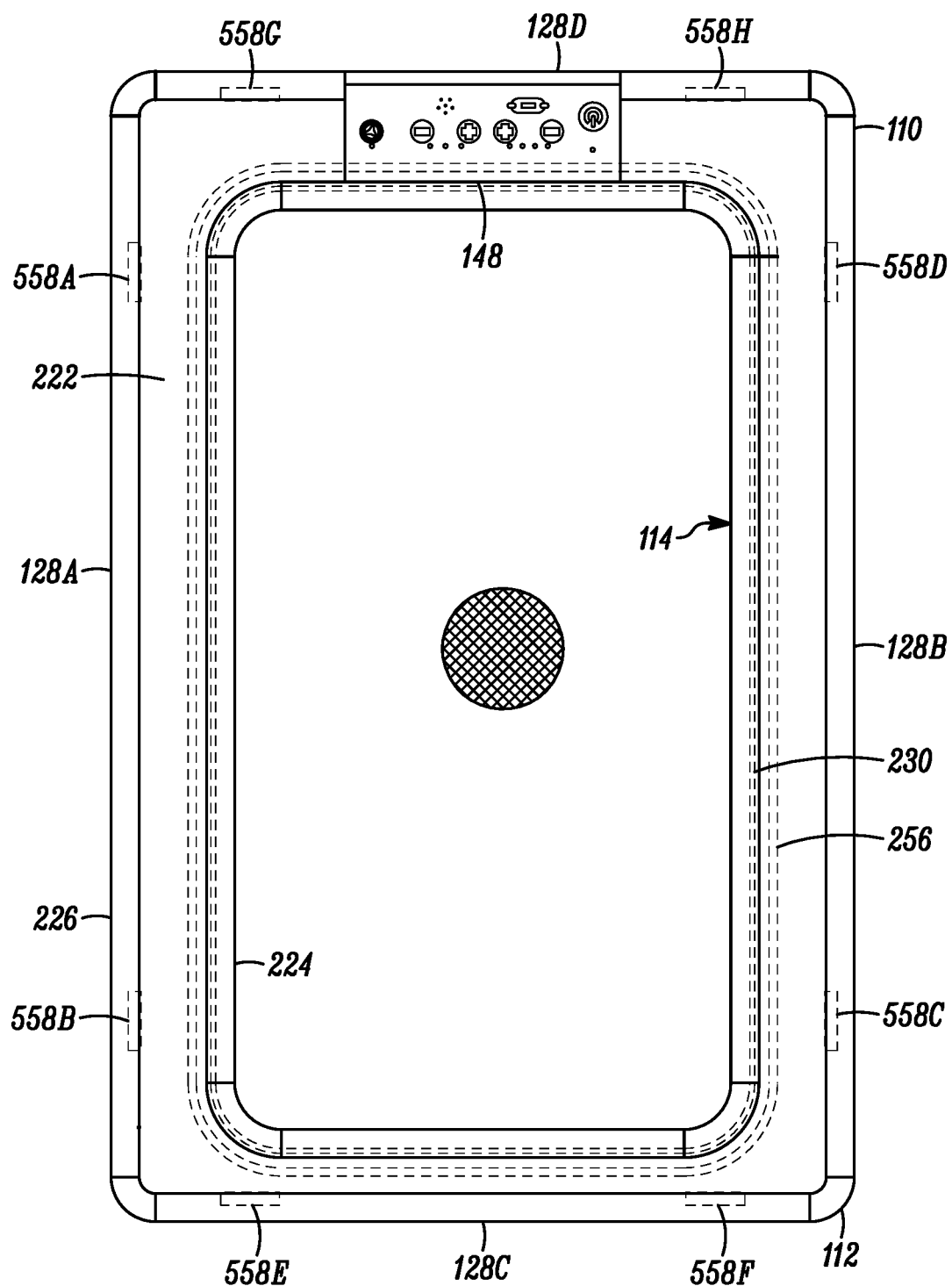
FIG. 6A is a bottom view illustration of the metal detector of FIG. 5, showing an object centered within an opening of the metal detector.

FIG. 6A is a bottom view illustration of the metal detector 110 showing an example of the object comprised of the metallic material disposed within the opening 114. More specifically, the object is centered within the opening 114 with respect to the rails 128A-D.

Figure 6B:
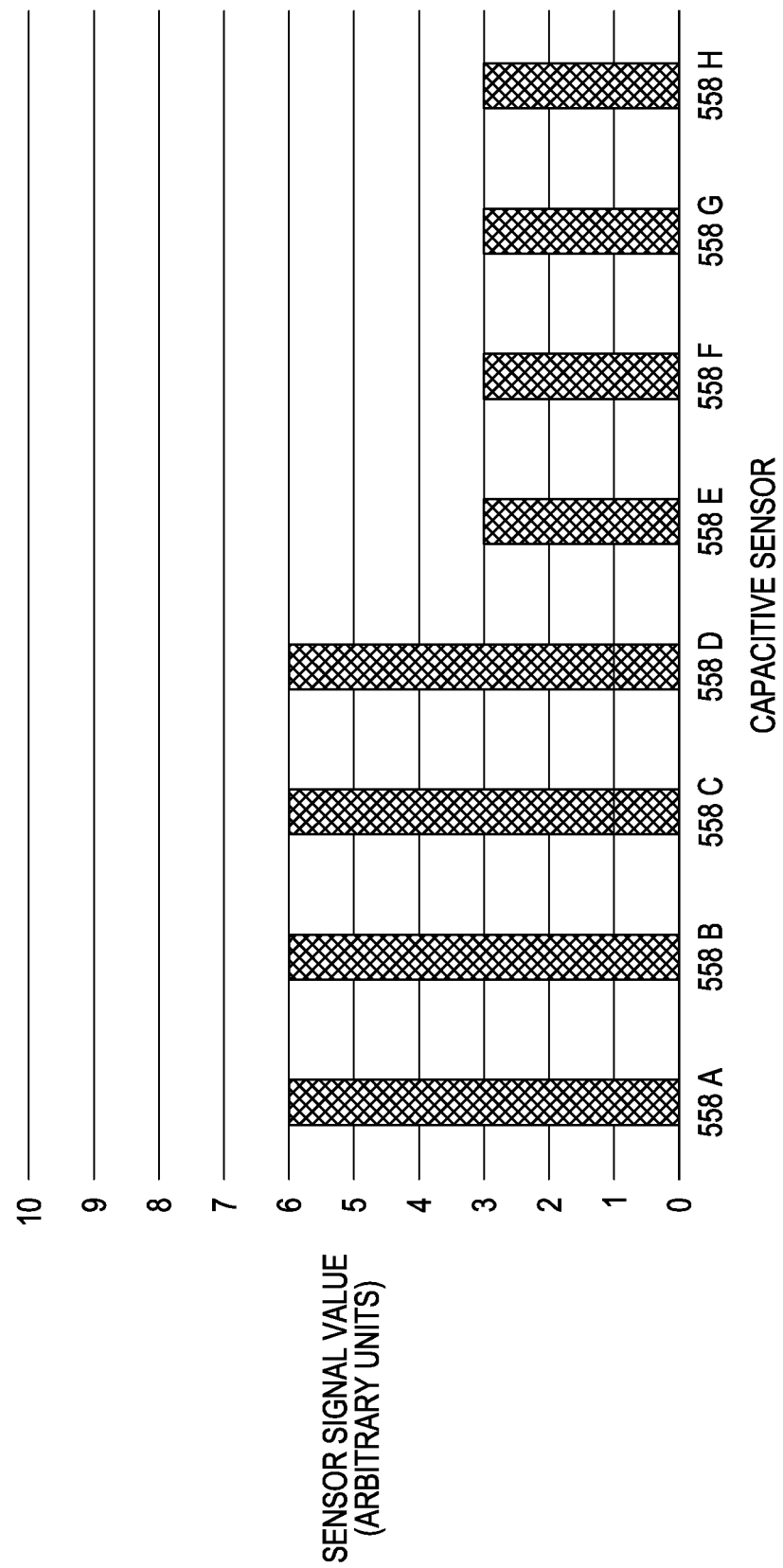
FIG. 6B is bar graph showing the sensor signal value of each of the capacitive sensors of FIG. 6A.

FIG. 6B is a bar graph corresponding to the position of the object shown in FIG. 6A. The graph is a representation of the sensor signal value (i.e., sensor strength) with respect to each of the capacitive sensors 558A-H. The sensor signal value is plotted along the y-axis while each of the capacitive sensors 558A-H are individually plotted along the x-axis. The sensor signal value is plotted as arbitrary units, but could be any suitable signal value unit. Because the object is disposed in the opening 114, the sensor signal value of each of the capacitive sensors 558A-H is positive. The body 112 of the metal detector 110 has a rectangular configuration, with two of the rails 128A-B being longer than the other two rails 128C-D. Therefore, the capacitive sensors 558A-D disposed on the long rails 128A-B are closer to the capacitive sensors 558E-H on the short rails 128C-D. As such, the capacitive sensors 558A-D disposed on the long rails 128A-B produce a sensor signal value that is higher than the capacitive sensors 558E-H disposed on the short rails 128C-D. Because all of the sensor signal values are positive, the controller 340 will determine that the object is in the opening 114.

Figure 7A:
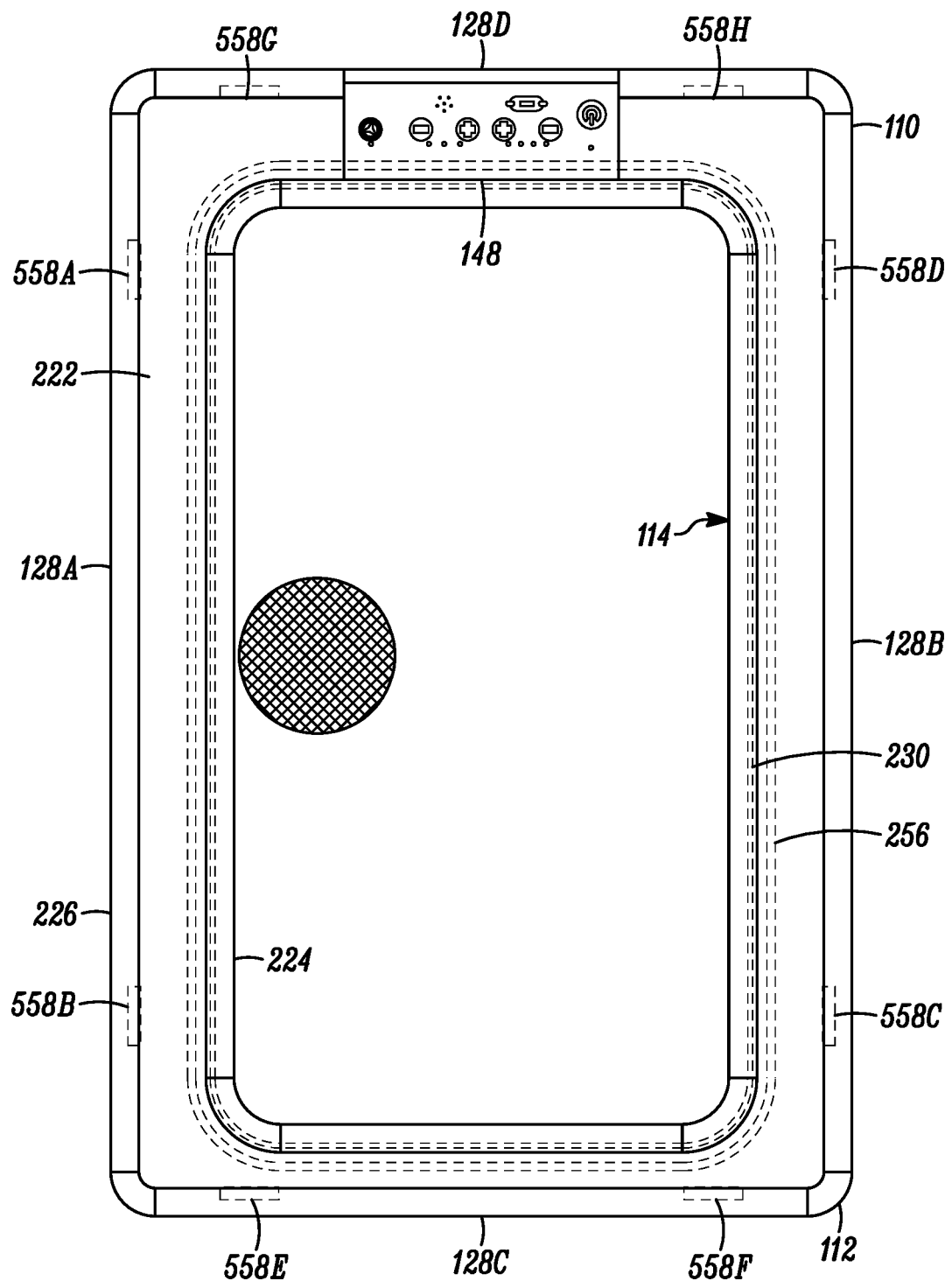
FIG. 7A is a bottom view illustration of the metal detector of FIG. 5, showing the object positioned within the opening adjacent a rail of the metal detector.

FIG. 7A is a bottom view illustration of the metal detector 110 showing an example of the object comprised of the metallic material disposed within the opening 114. More specifically, the object is positioned within the opening 114 adjacent the rail 128A.

Figure 7B:
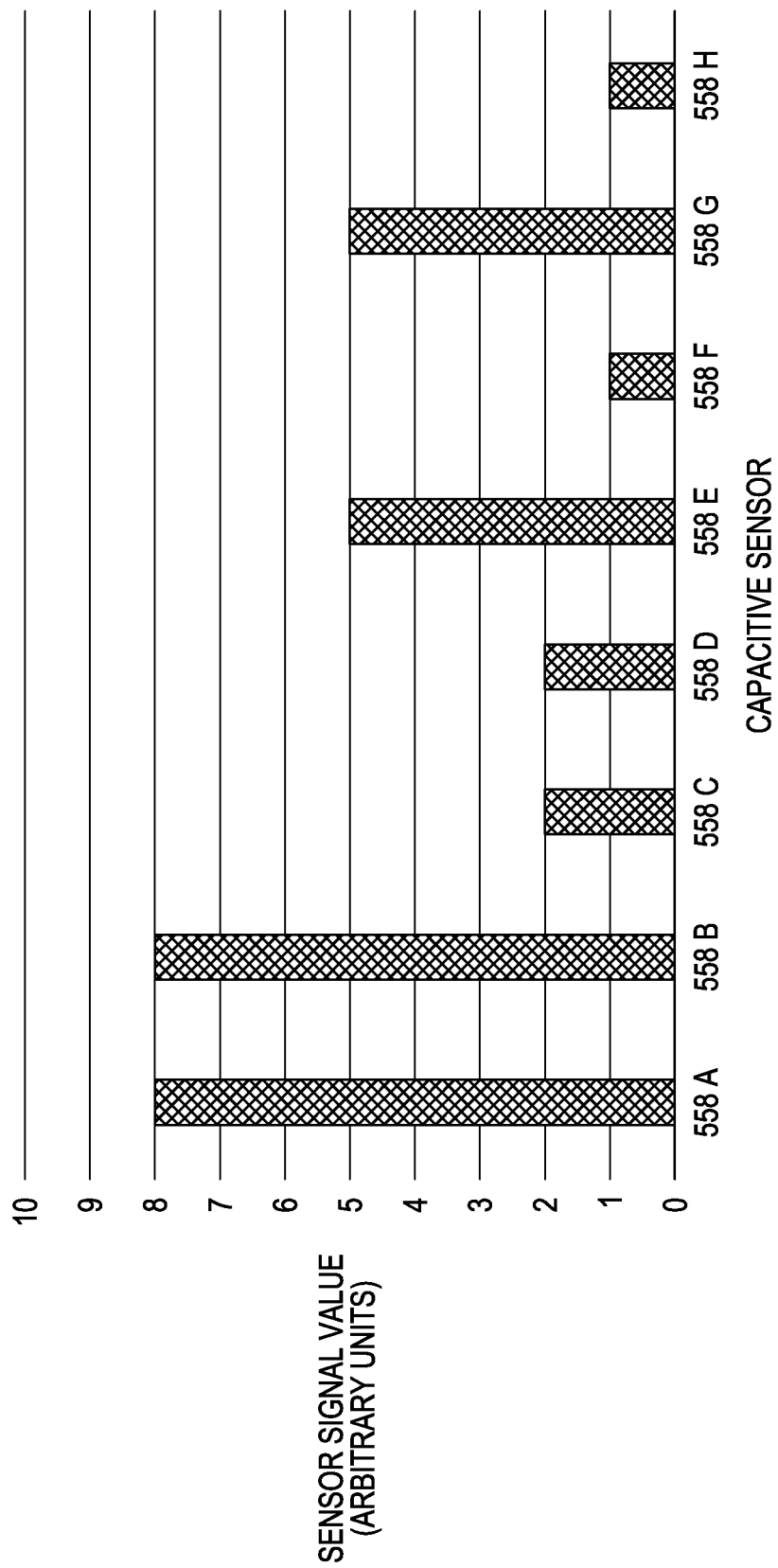
FIG. 7B is bar graph showing the sensor signal value of each of the capacitive sensors of FIG. 7A.

FIG. 7B is a bar graph corresponding to the position of the object shown in FIG. 7A. The graph is a representation of the sensor signal value (i.e., sensor strength) with respect to each of the capacitive sensors 558A-H. The sensor signal value is plotted along the y-axis while each of the capacitive sensors 558A-H are individually plotted along the x-axis. The sensor signal value is plotted as arbitrary units, but could be any suitable signal value unit. Because the object is disposed in the opening 114, the sensor signal value of each of the capacitive sensors 558A-H is positive. The capacitive sensors 558A-B disposed on the rail 128A adjacent the object are closest to the object and produce the highest sensor signal value. The other capacitive sensors 558C-H have lower sensor signal values that directly correspond to the distance of each of capacitive sensors 558C-H from the object. Because all of the sensor signal values are positive, the controller 340 will determine that the object is in the opening 114.

Figure 8A:
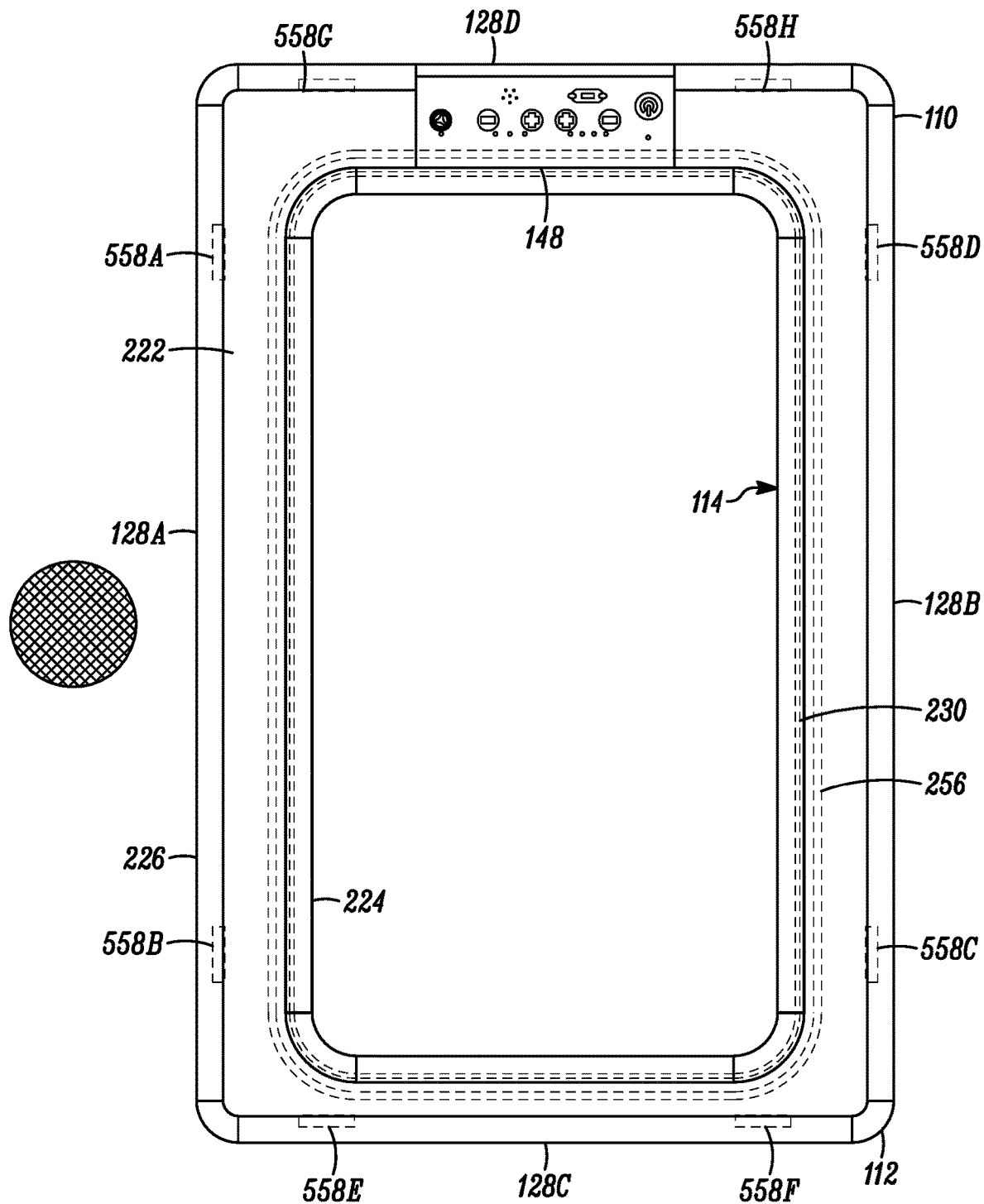
FIG. 8A is a bottom view illustration of the metal detector of FIG. 5, showing the object positioned outside of the opening and adjacent the rail of the metal detector.

FIG. 8A is a bottom view illustration of the metal detector 110 showing an example of the object comprised of the metallic material disposed within the opening 114. More specifically, the object is positioned outside of the opening 114, but is adjacent the rail 128A.

Figure 8B:
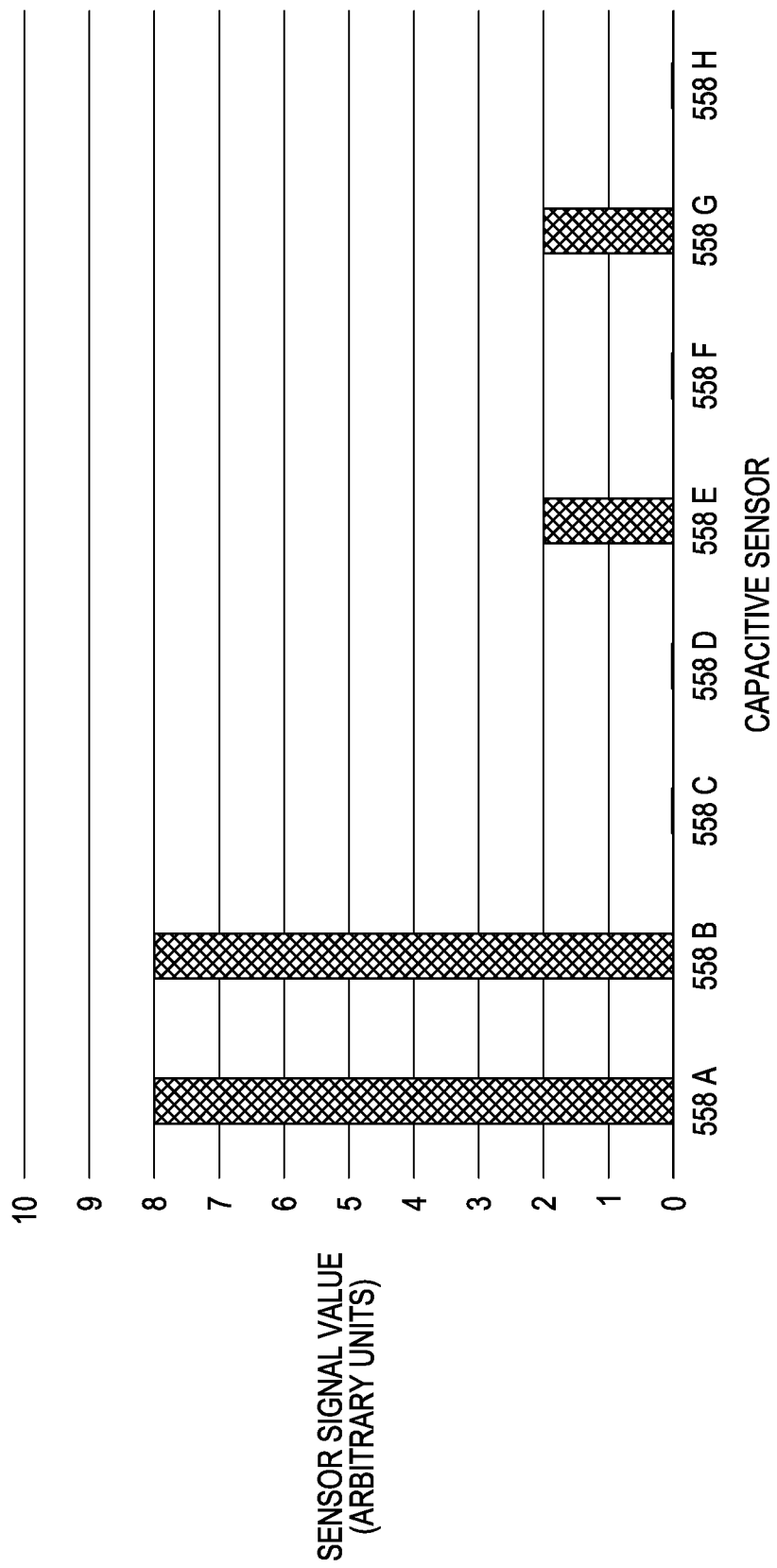
FIG. 8B is bar graph showing the sensor signal value of each of the capacitive sensors of FIG. 8A.

FIG. 8B is a bar graph corresponding to the position of the object shown in FIG. 8A. The graph is a representation of the sensor signal value (i.e., sensor strength) with respect to each of the capacitive sensors 558A-H. The sensor signal value is plotted along the y-axis while each of the capacitive sensors 558A-H are individually plotted along the x-axis. The sensor signal value is plotted as arbitrary units, but could be any suitable signal value unit. Because the object is positioned adjacent the rail 128A and is within the range of four of the capacitive sensors 558A, B, E, G (i.e., within a distance equal or less than the distance of the capacitive sensor to the rail that the capacitive sensor faces), the four capacitive sensors 558A, B, E, G produce a positive sensor signal value. However, the object is outside of the range of four of the capacitive sensors 558C, D, F, H such that no sensor signal value is produced. Because four of the sensor signal values are zero, the controller 340 will determine that the object is outside of the opening 114.

It is to be appreciated that the controller 340 may use an algorithm that takes the sensor signal values of the capacitive sensors 558A-H as inputs and may estimate the position of the object relative to the opening 114 of the metal detector 110 (for any arbitrary sensor reading magnitude or positivity). Moreover, the sensor readings in the bar graphs of FIGS. 6B, 7B, and 9B may not be indicative of real-world sensor readings. For example, while all of the sensor signal values in FIGS. 6B and 7B are shown as positive and the controller 340 thus determines that the object is in the opening 114, one or more of the sensor signal values may be negative and still lead the controller 340 to determine that the object is in the opening 114.

While the example shown in the Figures utilize the capacitive sensors 558A-H to determine the proximity of the object, the proximity of the object may be determined in other examples in different manners. For example, proximity could be determined from the time to receive the induced voltage from the coil 230. In another example, the metal detector 110 may include multiple coils 230 that detect the metallic material. The multiple coils 230 may each transmit an induced voltage to the controller 340. The difference in time for the induced signals to return to the controller 340, in view of the location and distance of the coils 230 from the controller 340, may be used to determine the location of the object relative to the opening.

Figure 9:
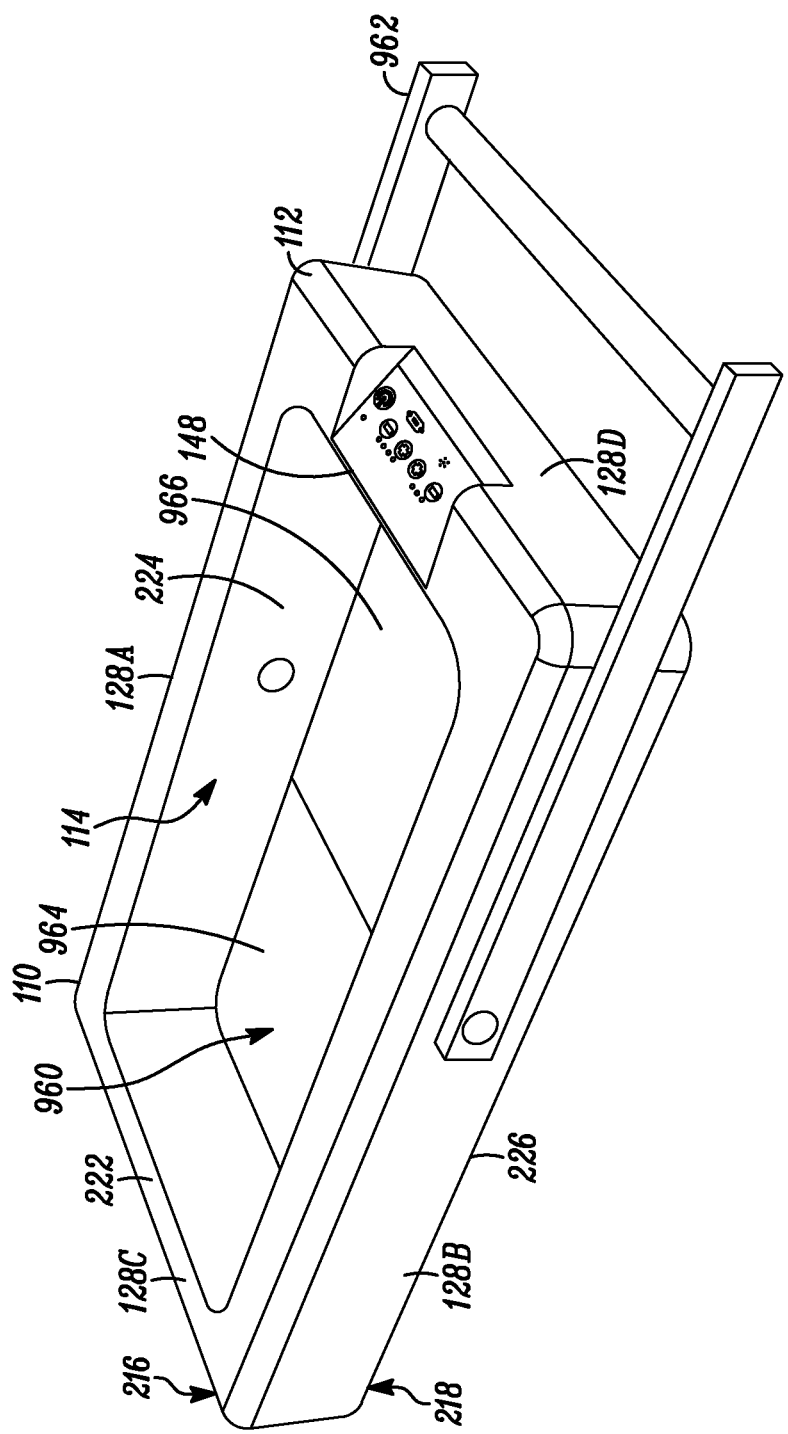
FIG. 9 is a perspective view illustration of an example implementation of the metal detector having a door and a handle.
Figure 10:
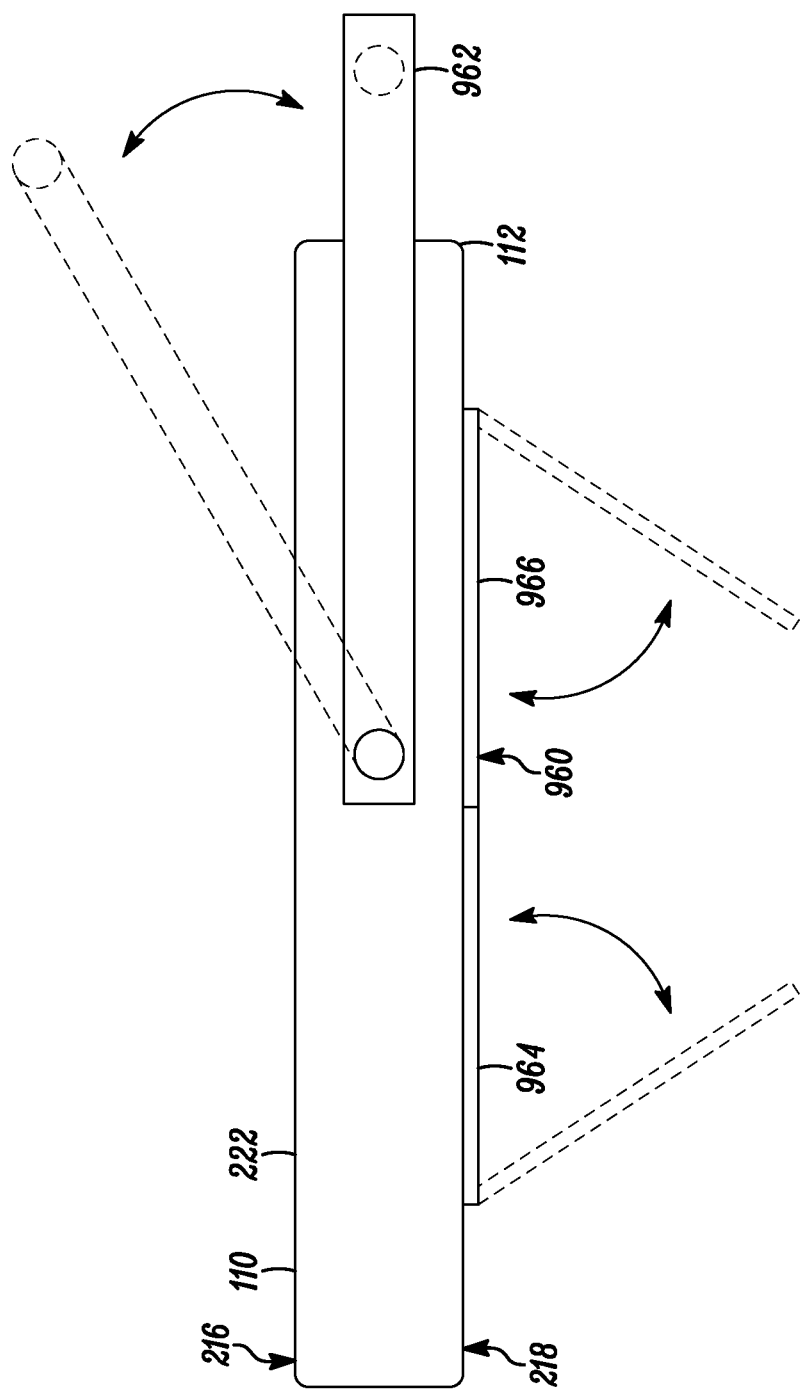
FIG. 10 is a side view illustration of the metal detector of FIG. 9.

FIGS. 9 and 10 are perspective and side view illustrations, respectively, of an example implementation of the metal detector 110 further including a door 960 positioned adjacent the bottom side 218 of the body 112 and moveable between a closed position (FIG. 9) and an open position (FIG. 10). The door 960 in the closed position is configured to retain the refuse therein and the controller determines from the induced voltage that the refuse includes the object comprised of the metallic material. The door 960 in the open position is configured to allow the refuse to move through the opening 114 and into the receptacle 102 after removal of the object from the refuse. More specifically, the door 960 serves as a staging area for the refuse before entering the receptacle 102. The disposition of the door 960 adjacent the bottom side 218 of the body 112 defines a void through the opening 114 between the bottom side 218 and the top side 216. With the door 960 in the closed position, the refuse may be placed on the door 960 and fill the opening 114. The placement of the refuse on the door 960 gives the controller 340 more time to determine if the object comprised of metallic material is located in the refuse when compared to examples in which the refuse passes unrestricted through the opening 114 into the receptacle 102. Additionally, the placement of the refuse on the door 960 provides access to the refuse to remove the object therefrom before the refuse enters the receptacle 102.

The metal detector 110 further comprises a handle 962 coupled to the door 960 and configured to be actuated by the operator to correspondingly move the door 960 between the closed position and the open position. Accordingly, the operator may control the amount and speed at which the refuse passes through the metal detector 110 and into the receptacle 102. More specifically, the operator may place the refuse into the opening 114 with the door 960 in the closed position. The metal detector 110 may then determine if the object comprised of the metallic material is present in the refuse. If the object is not present, the operator may actuate the handle 962 to move the door 960 to the open position and allow the refuse to enter the receptacle 102. If the object is present, the operator may remove the object from the refuse in the opening 114 before actuating the handle 962 to move the door 960 to the open position.

It is to be appreciated that in other examples, the movement of the door 960 may be automated. For example, the door 960 may remain in the closed position until the opening 114 is filled with refuse and the metal detector 110 determines that the object comprised of the metallic material is not present in the refuse. At this point, the controller 340 may actuate the door 960 (e.g., by electromechanical actuation, hydraulic actuation, pneumatic actuation, etc.) to move the door 960 to the open position and allow the refuse to pass into the receptacle 102.

The door 960 comprises a first section 964 and a second section 966 each pivotally coupled to the body 112. The first section 964 and the second section 966 extend toward one another in the closed position and are configured to pivot away from one another in the open position to allow the refuse to move through the opening 114. Accordingly, the first section 964 and the second section 966 are configured to allow the refuse to move generally through the center of the opening 114 as opposed to sides of the opening 114 (i.e., near the body 112), which reduces binding against the body 112 and improves the movement of the refuse. However, the door 960 may have any suitable configuration that may move between the open position and the close position.

While implementations have been illustrated and described, it will be appreciated that various changes can be made therein without departing from the spirit and scope of the disclosure. Moreover, the various features of the implementations described herein are not mutually exclusive. Rather any feature of any implementation described herein may be incorporated into any other suitable implementation. If the concept and technical scheme of the disclosure are directly applied to other occasions, they all fall within the protection scope of the present disclosure.

What is claimed is:

1. A metal detector for use with a receptacle to receive refuse, the metal detector comprising:
 a body defining an opening for receiving the refuse therethrough;
 a controller;
 a coil mounted to the body, wound around the opening, and in communication with the controller, wherein the controller is configured to detect changes to a magnetic field generated by the coil when an object comprised of a metallic material that is located proximate the coil interacts with the magnetic field and induces a voltage within the coil; and
 a capacitive sensor mounted to the body, facing into the opening, and in communication with the controller, wherein the controller is further configured to detect the object located within the opening based on a proximity signal produced by the capacitive sensor when the object interacts with an electrical field emitted into the opening by the capacitive sensor to change a capacitance of the capacitive sensor,
 wherein when the controller determines that the object is comprised of a metallic material and disposed within the opening based on the induced voltage and the proximity signal, the metal detector correspondingly produces an alarm.

2. The metal detector of claim 1, wherein the body comprises an external surface having a first portion that defines the opening and a second portion spaced from the first portion and facing away from the opening and wherein the coil is mounted within the body between the first portion and the second portion.

3. The metal detector of claim 2, wherein the body comprises an internal surface defining a cavity that surrounds the opening and wherein the coil contacts the internal surface adjacent the first portion of the external surface.

4. The metal detector of claim 3, wherein the body includes a top side and a bottom side, opposite the top side, with the opening extending through the body between the top side and the bottom side, and wherein the coil comprises a wire having a plurality of windings around the opening that extend between the top side and the bottom side.

5. The metal detector of claim 3, further comprising a shield disposed within the cavity between the coil and the second portion of the external surface and configured to reduce electromagnetic interference from outside of the opening of the body.

6. The metal detector of claim 5, wherein the shield surrounds the coil around the opening.

7. The metal detector of claim 6, wherein the shield extends substantially parallel to the coil from the internal surface adjacent a top side of the body to the internal surface adjacent a bottom side of the body that is opposite the top side.

8. The metal detector of claim 1, further comprising more than one of the capacitive sensor, with the capacitive sensors spaced around the body and each facing into the opening, and the controller is configured to receive the proximity signals from the capacitive sensors and determine from the proximity signals that the object is disposed within the opening.

9. The metal detector of claim 8, wherein the body comprises rails arranged in a polygonal configuration about the opening and at least one of the capacitive sensors is disposed on each of the rails.

10. The metal detector of claim 1, wherein the body includes a top side and a bottom side, opposite the top side, with the opening extending through the body between the top side and the bottom side, wherein the body defines a channel that extends in from the bottom side and is configured to receive a receptacle to which the metal detector is mounted, and wherein the coil is mounted to the body between the channel and the opening.

11. The metal detector of claim 1, wherein the controller is configured to transmit pulses of a current to the coil to create the magnetic field that interacts with the object that is detected by the controller as the induced voltage.

12. The metal detector of claim 1, wherein the controller is configured to measure an integrated voltage of the coil over a period of time from the induced voltage and compare the integrated voltage to an average voltage to determine if the object is comprised of a metallic material.

13. The metal detector of claim 1, further comprising a speaker in communication with the controller, wherein the alarm comprises an audible output produced by the speaker.

14. A metal detector for use with a receptacle to receive refuse, the metal detector comprising:
- a body including a top side and a bottom side, opposite the top side, and defining an opening extending through the body between the top side and the bottom side and configured to receive the refuse therethrough;
- a controller;
- a coil mounted to the body, wound around the opening, and in communication with the controller, wherein the controller is configured to detect changes to a magnetic field generated by the coil when an object comprised of a metallic material and located within the opening interacts with the magnetic field and induces voltage within the coil; and
- a door positioned adjacent the bottom side of the body and moveable between a closed position and an open position,
- wherein the door in the closed position is configured to retain the refuse therein and the controller determines from the induced voltage that the refuse includes the object comprised of the metallic material,
- wherein the door in the open position is configured to allow the refuse to move through the opening and into the receptacle after removal of the object from the refuse,
- wherein the door comprises a first section and a second section each pivotally coupled to the body, and
- wherein the first section and the second section extend toward one another in the closed position and are configured to pivot away from one another in the open position to allow the refuse to move through the opening.

15. The metal detector of claim 14, wherein when the controller determines that the object is comprised of the metallic material and disposed within the opening based on the induced voltage, the metal detector correspondingly produces an alarm.

16. The metal detector of claim 14, further comprising a handle coupled to the door and configured to be actuated by an operator and correspondingly move the door between the closed position and the open position.

17. The metal detector of claim 14, further comprising:
- a capacitive sensor mounted to the body and facing into the opening,
- wherein the controller is configured to detect the object located within the opening from a proximity signal produced by the capacitive sensor when the object interacts with an electrical field of the capacitive sensor, and
- wherein when the controller determines that the object is comprised of a metallic material and disposed within the opening based on the induced voltage and the proximity signal, the metal detector correspondingly produces an alarm.

18. The metal detector of claim 14, wherein the body includes a top side and a bottom side, opposite the top side, with the opening extending through the body between the top side and the bottom side, and wherein the body defines a channel that extends in from the bottom side and is configured to receive a receptacle to which the metal detector is mounted.

19. A metal detector for use with a receptacle to receive refuse, the metal detector comprising:
- a body having a top side and a bottom side, opposite the top side, and comprising:
  - an external surface having a first portion and a second portion spaced from and facing away from the first portion, the first portion defining an opening extending through the body between the top side and the bottom side and configured to receive the refuse therethrough; and
  - an internal surface defining a cavity that surrounds the opening;
- a controller;
- a coil mounted to the body within the cavity and disposed along the internal surface adjacent the first portion of the external surface, the coil comprising a wire having a plurality of windings around the opening that extend between the top side and the bottom side, wherein the controller is in communication with the coil and the controller is configured to detect changes to a magnetic field generated by the coil when an object comprised of a metallic material and located within the opening interacts with the magnetic field and induces a voltage within the coil; and
- a shield disposed within the cavity between the coil and the second portion of the external surface, extending from the internal surface adjacent the top side of the body to the internal surface adjacent the bottom side of the body, surrounding the coil around the opening, and configured to reduce electromagnetic interference from outside of the opening of the body,
- wherein the body defines a channel that extends in from the bottom side and is configured to receive a receptacle to which the metal detector is mounted.

20. The metal detector of claim 19, further comprising:
a capacitive sensor mounted to the body and facing into the opening,
wherein the controller is configured to detect the object located within the opening from a proximity signal produced by the capacitive sensor when the object interacts with an electrical field emitted into the opening by the capacitive sensor to change a capacitance of the capacitive sensor, and
wherein when the controller determines that the object is comprised of a metallic material and disposed within the opening based on the induced voltage and the proximity signal, the metal detector correspondingly produces an alarm.

* * * * *